(12) United States Patent
Mack

(10) Patent No.: US 8,101,098 B2
(45) Date of Patent: Jan. 24, 2012

(54) ADDITIVE COMPRISING AZOMETHINE COMPOUNDS

(75) Inventor: Helmut Mack, Traunstein (DE)

(73) Assignee: Construction Research & Technology GmbH, Trostberg (DE)

( * ) Notice: Subject to any disclaimer, the term of this patent is extended or adjusted under 35 U.S.C. 154(b) by 644 days.

(21) Appl. No.: 12/282,508

(22) PCT Filed: Feb. 15, 2007

(86) PCT No.: PCT/EP2007/001304
§ 371 (c)(1),
(2), (4) Date: Oct. 24, 2008

(87) PCT Pub. No.: WO2007/107216
PCT Pub. Date: Sep. 27, 2007

(65) Prior Publication Data
US 2009/0166581 A1     Jul. 2, 2009

(30) Foreign Application Priority Data
Mar. 17, 2006   (DE) .......................... 10 2006 012 774

(51) Int. Cl.
*B05D 7/26* (2006.01)
*H01B 3/20* (2006.01)

(52) U.S. Cl. ..................... 252/573; 106/499; 106/153.1; 106/287.1; 423/324; 423/347; 427/387; 524/262

(58) Field of Classification Search ................. 252/500, 252/573; 106/499, 153.1, 287.1; 423/324, 423/347; 427/387; 524/262
See application file for complete search history.

(56) References Cited

U.S. PATENT DOCUMENTS

| | | | |
|---|---|---|---|
| 4,268,548 A * | 5/1981 | Burba et al. | 427/387 |
| 4,278,713 A * | 7/1981 | Burba et al. | 427/388.2 |
| 4,378,250 A | 3/1983 | Treadway | |
| 6,525,159 B1 | 2/2003 | Okuhira | |
| 2002/0183439 A1* | 12/2002 | Barsotti et al. | 524/500 |
| 2003/0044738 A1* | 3/2003 | Takeyama | 430/620 |
| 2004/0039089 A1* | 2/2004 | Buckmann et al. | 524/104 |
| 2006/0089432 A1* | 4/2006 | Kawakami et al. | 524/59 |

* cited by examiner

*Primary Examiner* — Lorna M Douyon
*Assistant Examiner* — Tri V Nguyen
(74) *Attorney, Agent, or Firm* — Curatolo Sidoti Co., LPA; Joseph G. Curatolo; Vincent A. Cortese

(57) ABSTRACT

The present invention relates to a mixture of an oligomeric, blocked aminosilane (azomethine structure) and a monomeric, blocked, primary amine (azomethine structure). This mixture is suitable in particular as a curing agent, crosslinker and adhesion promoter.

12 Claims, No Drawings

ADDITIVE COMPRISING AZOMETHINE COMPOUNDS

CROSS REFERENCE TO RELATED APPLICATIONS

This application is a national stage application of International Application No. PCT/EP2007/01304, filed 15 Feb. 2007, which claims the benefit of Application No. DE 102006012774.9, tiled 17 Mar. 2006 from which applications priority is claimed, and which are incorporated herein by reference.

The present invention relates to a flowable additive, to a process for preparing this flowable additive and to the use of the flowable additive.

There are numerous curing agents, crosslinkers and adhesion promoters known which are applied in the form of adjuvants to the substrates to be cured and/or set, such as polymer surfaces. In the art there is demand in particular for adjuvants which find use as curing agents, crosslinkers and adhesion promoters for polyurethanes, silicones, acrylates, polysulphides, silylated polymers (MS Polymer®, XMAP®, SPUR®, etc.) and epoxide-containing preparations, such as epoxy resins, epoxidized polysulphides, etc. One important group of such adjuvants are siloxane oligomers, examples being aminopropyl-functional siloxane oligomers, which are described in DE-A-198 49 308. In addition, as elucidated in JP-B-7247295, monomeric organosilicon compounds with a ketimine structure may also form the basis for such adjuvants.

It is an object of the present invention to provide an additive which in terms of handling (labelling, sensitization, VOC—volatile organic compounds—content, flash point, etc.) and in terms of activity (reactivity, film formation, etc.) offers advantages over the known adjuvants which function as curing agents, crosslinkers and/or adhesion promoters and which contain organosilicon compounds.

The achievement of this object consists in a flowable additive comprising
an Si-activable, oligomeric azomethinesilane component A) and
an azomethine component B)
in a molar ratio of 100:0.1 to 1:1, with a fraction totalling >5% by weight, the Si-activable, oligomeric azomethinesilane component A) being preparable by reacting an aminosilane c) (present for example in the form of a compound of the formula $(CH_3O)_3Si—(CH_2)_3—NH_2$) of the general formula

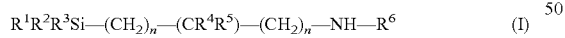

$$R^1R^2R^3Si—(CH_2)_n—(CR^4R^5)—(CH_2)_n—NH—R^6 \quad (I)$$

where
n=0 or 1;
$R^4$ and $R^5$ each independently of one another=H or $C_1$-$C_4$ n-alkyl (especially methyl, ethyl);
$R^1$ and $R^2$ each independently of one another =Cl, $OR^7$, $C_1$-$C_{18}$ n-alkyl (especially methyl, ethyl), $C_5$-$C_8$ cycloalkyl (especially cyclohexyl) or $C_1$-$C_{18}$ branched alkyl (especially isopropyl);
$R^3$=Cl or $OR^7$;
$R^7$=$C_1$-$C_6$ n-alkyl (especially methyl, ethyl), $C_1$-$C_6$ branched alkyl (especially isopropyl) or phenyl;
$R^6$=H, $CH_2—CH_2—NH_2$ or $CH_2—CH_2—NH—CH_2—CH_2—NH_2$,
with formation (in situ) of water and an Si-activable monomeric azomethinesilane component as intermediates, with a carbonyl compound d) (present for example in the form of sec-butyl methyl ketone, ethyl methyl ketone or acetone) of the general formula

$$R^{11}—CO—R^{12} \quad (II)$$

where
$R^{11}$=$C_1$-$C_{30}$ n-alkyl (especially methyl, ethyl), $C_1$-$C_{30}$ branched alkyl (especially isopropyl), $C_5$-$C_8$ cycloalkyl (especially cyclohexyl), $C_6$-$C_{18}$ aryl (especially phenyl), $C_1$-$C_{30}$ alkylaryl (especially tolyl) or H;
$R^{12}$=$C_1$-$C_{39}$ n-alkyl (especially methyl, ethyl), $C_1$-$C_{30}$ branched alkyl (especially isopropyl), $C_5$-$C_8$ cycloalkyl (especially cyclohexyl), $C_6$-$C_{18}$ aryl (especially phenyl) or $C_1$-$C_{30}$ alkylaryl (especially tolyl);
or cyclic $C_5$-$C_8$ alkyl group (especially cyclopentyl or cyclohexyl group) formed jointly by $R^{11}$ and $R^{12}$ together with the C atom connecting $R^{11}$ and $R^{12}$,
with the proviso that per mole of aminosilane c) employed there are 0.6 to 1.2 mol (normally 0.6 to 1 mol) of the water intermediate formed available for the oligomerization—which consumes water as a reaction component—of the Si-activable monomeric azomethinesilane component produced as intermediate, and
the azomethine component B) (present for example in the form of the compound of the formula $(CH_3)_2C=N—(CH_2—)_6N=C(CH_3)_2)$ is described by the general formula

$$X—N=CR^{21}R^{22} \quad (III)$$

where
$R^{21}$=$C_1$-$C_{30}$ n-alkyl (especially methyl, ethyl), $C_1$-$C_{30}$ branched alkyl (especially isopropyl), $C_5$-$C_8$ cycloalkyl (especially cyclohexyl), $C_6$-$C_{18}$ aryl (especially phenyl), $C_1$-$C_{30}$ alkylaryl (especially tolyl) or H;
$R^{22}$=$C_1$-$C_{30}$ n-alkyl (especially methyl, ethyl), $C_1$-$C_{30}$ branched alkyl (especially isopropyl), $C_5$-$C_8$ cycloalkyl (especially cyclohexyl), $C_6$-$C_{18}$ aryl (especially phenyl) or $C_1$-$C_{30}$ alkylaryl (especially tolyl);
or cyclic $C_5$-$C_8$ alkyl group (especially cyclopentyl or cyclohexyl group) formed jointly by $R^{21}$ and $R^{22}$ together with the C atom connecting $R^{21}$ and $R^{22}$;
X=$C_1$-$C_{18}$ n-alkyl (especially $C_1$-$C_6$ n-alkyl, e.g. n-hexyl), $C_5$-$C_8$ cycloalkyl (especially cyclohexyl) or $C_1$-$C_{18}$ branched alkyl group (preferably $C_1$-$C_6$ alkyl group, e.g. isopropyl group), $C_1$-$C_{18}$ n-alkyl group containing O and/or N heteroatoms (especially $CH_2—CH_2—NH—CH_2—CH_3$, $CH_2—CH_2—O—CH_2—CH_3$), $C_5$-$C_8$ cycloalkyl group containing O and/or N heteroatoms (especially pyrrolidine radical, piperidine radical) or $C_1$-$C_{18}$ branched alkyl group containing O and/or N heteroatoms (preferably —$CH_2$—NH—CH$(CH_3)_2$, —$CH_2$—O—CH$(CH_3)_2$), having in each case 0 to 3 alike or different —N=$CR^{21}R^{22}$ substituents.

By a flowable additive is meant, in the widest sense, any additive whose viscosity is sufficiently low that the additive can be applied to a surface.

Si-activable means that the compound in question has at least one silicon atom amenable to attack by a water molecule, resulting in oligomerization via an Si—O—Si bridge. Normally, chloro and/or alkoxy substituents on the silicon atom ensure the "Si activability". The generic term "azomethine component" embraces ketimine compounds and aldimine compounds.

The aminosilanes employed may be prepared in particular as follows:
Preparation Variant i)

Allyl chloride $(Cl—CH_2—CH=CH_2)$ is reacted in a first step with trichlorosilane $(HSiCl_3)$ to form 3-chloropropyl-trichlorosilane $(Cl—CH_2—CH_2—CH_2—SiCl_3)$. The 3-chloropropyltrichlorosilane is subsequently esterified to form 3-chloropropyltrialkoxysilane (Cl—CH$_2$—CH$_2$—CH$_2$—Si(OR)$_3$), which, finally, is reacted with ammonia (nucleophilic substitution), giving the aminosilane H$_2$N—(CH$_2$)$_3$—Si(OR)$_3$.

Preparation Variant ii)

Acrylonitrile (NC—CH=CH$_2$) is reacted with trichlorosilane to form NC—CH$_2$—CH$_2$—SiCl$_3$. The product obtained is esterified to form NC—CH$_2$—CH$_2$—Si(OR)$_3$. By subsequent hydrogenation, finally, H$_2$N—(CH$_2$)$_3$—Si(OR)$_3$ is obtained.

The reaction of aminosilane c) (e.g. 3-aminopropyltriethoxysilane—available commercially under the trade name Dynasylan® AMEO (Degussa AG) or Silquest® A-1100 (GE)) with the carbonyl compound d) produces in a first reaction step, with elimination of water, a silicon-activable monomeric azomethinesilane component (a blocked aminosilane). The latter reacts as a kind of (in situ) intermediate with the water eliminated in the first reaction step, in an oligomerization which forms Si—O—Si bridges. The underlying reaction mechanism can be illustrated using the example below.

Step 1—Blocking of the Amine Group

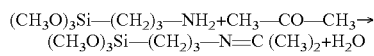

Aminosilane c) Carbonyl Si-activable, monomeric compound d) azomethinesilane component Step 2—Oligomerization

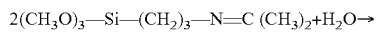

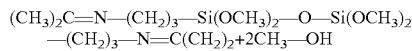

Si-activable, oligomeric (dimeric) azomethinesilane component A)

=> where appropriate, ongoing oligomerization by reaction with the water intermediate formed in step 1

The extent of the oligomerization (or of the polymerization) depends directly on the amount of water available, the general rule being as follows: the greater the amount of water provided, the higher the degree of oligomerization (or the degree of polymerization). In accordance with the invention the degree of oligomerization is set in this way such that per mole of aminosilane c) employed there are 0.6 to 1.2 mol (normally 0.6 to 1 mol) of the water intermediate formed provided for the oligomerization—which consumes water as a reaction component—of the Si-activable monomeric azomethinesilane component produced as intermediate. The resultant oligomers then typically have an average degree of oligomerization (number average) of approximately 2 to 100 (preferably approximately 2 to 20). If (in an embodiment which is not preferred), accordingly, more than one mole (up to 1.2 mol) of water is provided per mole of aminosilane c) employed, this means that, normally, it is necessary in addition to provide water (as well as the water intermediate formed), which is achieved, for example, through the addition of (additional) water. Naturally, the degree of oligomerization also depends on the number of leaving groups (i.e. Si-bonded alkoxy groups and/or chloro groups) the respective aminosilane c) employed possesses (Si-bonded alkyl groups do not function as leaving groups). Through the controlled/metered use of mixtures of different species of the aminosilanes c), each with a different number of leaving groups (i.e. 1 to 3), it is therefore possible to influence the degree of oligomerization likewise in a controlled way. It is possible in general to use different aminosilanes c).

As carbonyl compound c) as well it is possible to use mixtures of different species. The use of formaldehyde as a carbonyl compound c) is not envisaged, on environmental and toxicity grounds.

The flowable additive of the invention is capable of providing particularly good wetting of corresponding substrates, thereby ensuring effective film formation on the surfaces thus treated. As a result of the relatively high proportion of oligomers, the flowable additive contains constituents of relatively low volatility. It is assumed that the additive can be regarded as non-sensitizing. The Si-activable, oligomeric azomethinesilane component A) (generally: oligomeric blocked aminosilanes) satisfies the OECD definition of a polymer and need therefore not be listed additionally in corresponding registers (ELINCS). A further advantage of the relatively high oligomer fraction is that the additive of the invention has a relatively high boiling point (generally of 140 to 280° C.) and a relatively high flash point (usually of 90 to 140° C.). In respect of the adhesion promotion, crosslinking and curing properties as well, the flowable additive of the invention shows good results. In the course of crosslinking, the azomethine component B) (the blocked amine) is generally unblocked more quickly (under the influence of added water) than, by comparison, the Si-activable, oligomeric azomethinesilane component A), so producing a kind of "preliminary crosslinking" of the surface to be crosslinked that is treated with the flowable additive. Through the use of mixtures of different species of the azomethine component B it is possible to modify the crosslinking properties. In many cases the aforementioned preliminary crosslinking enhances the mechanical properties of the crosslinked substrate. The azomethine component B) and its amine precursor prior to blocking are usually relatively inexpensive and so contribute to the good economics of the additive of the invention. Possible for use in principle, though not envisaged in accordance with the invention, is a corresponding additive which comprises the Si-activable, oligomeric azomethinesilane component A) but not the azomethine component B.

In one preferred embodiment of the invention the flowable additive further comprises an Si-inert, monomeric azomethinesilane component E) (in the form for example of the compound of the formula (CH$_3$)$_3$Si—CH$_2$—N=C(CH$_3$)$_2$) in a molar ratio to the Si-activable, oligomeric azomethinesilane component A) of 1:99 to 1:3, the Si-inert, monomeric azomethinesilane compound E) being described by the general formula

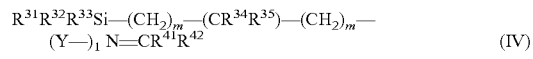

where m=0 or 1;

R$^{34}$ and R$^{35}$ each independently of one another=H or C$_1$-C$_4$ n-alkyl (especially methyl, ethyl);

R$^{31}$, R$^{32}$ and R$^{33}$ each independently of one another=C$_1$-C$_{18}$ n-alkyl (especially methyl, ethyl), C$_5$-C$_8$ cycloalkyl (especially cyclohexyl) or C$_1$-C$_{18}$ branched alkyl (especially isopropyl);

l=0 to 2;

Y=NH—CH$_2$—CH$_2$;

R$^{41}$=C$_1$-C$_{30}$ n-alkyl (especially methyl, ethyl), C$_1$-C$_{30}$ branched alkyl (especially isopropyl), C$_5$-C$_8$ cycloalkyl (especially cyclohexyl), C$_6$-C$_{18}$ aryl (especially phenyl), C$_1$-C$_{30}$ alkylaryl (especially tolyl) or H;

R$^{42}$=C$_1$-C$_{30}$ n-alkyl (especially methyl, ethyl), C$_1$-C$_{30}$ branched alkyl (especially isopropyl), C$_5$-C$_8$ cycloalkyl (especially cyclohexyl), C$_6$-C$_{18}$ aryl (especially phenyl) or C$_1$-C$_{30}$ alkylaryl (especially tolyl);

or cyclic $C_5$-$C_8$ alkyl group (especially cyclopentyl or cyclohexyl group) formed jointly by $R^{41}$ and $R^{42}$ together with the C atom connecting $R^{41}$ and $R^{42}$.

This Si-inert, monomeric azomethinesilane component E) has no Si-bound leaving groups and therefore cannot undergo oligomerization. It is also possible to use mixtures of these Si-inert, monomeric azomethinesilane components E).

The presence of the monomeric azomethinesilane component E) (preparable for example by hydrogenation of trimethylsilylnitrile (e.g. Dynasylan® TMSCN from Degussa AG) and subsequent reaction with a ketone and/or aldehyde) in the flowable additive of the invention has the effect of hydrophobizing the surface treated with the additive. The water resistance of the surface film is enhanced.

Normally the Si-activable, oligomeric azomethinesilane component A) and the azomethine component B) are present in a molar ratio of 20:1 to 4:1.

Usually the Si-activable, oligomeric azomethinesilane component A) and the azomethine component B) are present with a fraction totalling greater than 70% by weight in the flowable additive. If the flowable additive contains no Si-inert, monomeric azomethinesilane component E), the flowable additive may also be composed exclusively or nearly exclusively (i.e. to an extent of more than 98% by weight) of the Si-activable, oligomeric azomethinesilane component A) and the azomethine component B).

As an essential constituent of the additive of the invention, the nature of the Si-activable, oligomeric azomethinesilane component A) is dependent to a high degree on the technical details of its preparation process. Accordingly it is in general advantageous, when preparing the Si-activable, oligomeric azomethinesilane component A), to use the aminosilane c) with the carbonyl compound d) in a molar ratio of 1:0.9 to 0.9:1.0, but preferably equimolarly.

It has emerged as being advantageous if per aminosilane c) employed there is 0.7 to 0.9 mol (with particular preference approximately 0.8 mol) of the water intermediate formed available for the oligomerization—which consumes water as a reaction component—of the Si-activable, monomeric azomethinesilane component produced as intermediate. In practice this is normally achieved by removing a portion of the water produced as an intermediate in the reaction, said portion not being intended to be made available for the oligomerization—which consumes water as a reaction component—of the Si-activable, monomeric azomethinesilane component which forms as an intermediate, said removal taking place in such a way that this portion does not participate as a reaction component in the oligomerization. This is achieved by means, for example, of controlled, metered addition of water scavengers, such as salts (e.g. magnesium sulphate), zeolites (e.g. molecular sieves), etc. In addition or as an alternative it is also possible to remove the excess water azeotropically from the reaction mixture by distillation. Preferred degrees of oligomerization (number average) of the Si-activable, oligomeric azomethinesilane component A) are approximately 2 to 20Si units (e.g. chains and/or rings).

The reaction of the aminosilane c) with the carbonyl compound d) takes place in general by heating at 10 to 200° C., preferably at 80 to 150° C.

The flowable additive of the invention can be prepared by combining the individual components, the Si-activable, oligomeric azomethinesilane component A) and the azomethine component B) and also, where appropriate, the Si-inert, monomeric azomethinesilane component E) as well, these components having been prepared beforehand separately from one another. It is preferred, however, for the Si-activable, oligomeric azomethinesilane component A) and the azomethine component B) to be prepared together in a reactor, by initially introducing the aminosilane c) and an amine component (present for example in the form of the compound of the formula $NH_2$—$(CH_2$—$) NH_2$) of the general formula

$$Z—NH_2 \quad (V)$$

where $Z=C_1$-$C_{18}$ n-alkyl (especially $C_1$-$C_6$ n-alkyl, e.g. n-hexyl), $C_5$-$C_8$ cycloalkyl (especially cyclohexyl) or $C_1$-$C_{18}$ branched alkyl group (preferably $C_1$-$C_6$ alkyl group, e.g. isopropyl group), $C_1$-$C_{18}$ n-alkyl group containing O and/or N heteroatoms (especially $CH_2$—$CH_2$—$NH$—$CH_2$—$CH_3$, $CH_2$—$CH_2$—$O$—$CH_2$—$CH_3$), $C_5$-$C_8$ cycloalkyl group containing O and/or N heteroatoms (especially pyrrolidine radical, piperidine radical) or $C_1$-$C_{18}$ branched alkyl group containing O and/or N heteroatoms (preferably —$CH_2$—$NH$—$CH(CH_3)_2$, —$CH_2$—$O$—$CH(CH_3)_2$), substituted by in each case 0 to 3 primary amino groups and reacting this initial charge with the carbonyl compound d).

It is also possible to use different species of the amine component of the general formula (V) at the same time. Where appropriate it is also possible to prepare the Si-inert, monomeric azomethinesilane component E) in a corresponding way, if it is to be present in the flowable additive of the invention, jointly, together with the two abovementioned components A) and B). This is achieved by initially introducing the corresponding (as yet) unblocked aminosilane precursor of the Si-inert, monomeric azomethinesilane component E) at the beginning, together with said other (as yet) unblocked, amine-functional starting materials of components A) and B) and then reacting these starting materials, containing ("free") amine groups, of A), B) and C) jointly, correspondingly, with the carbonyl compound d).

If the Si-activable, oligomeric azomethinesilane component A) and the azomethine component B), and also, where appropriate, the Si-inert, monomeric azomethinesilane component E) as well are prepared together in a reactor, the technical process principles and provisos that apply (especially with regard to temperature regime, and also controlled removal of water) are in practice the same as those illustrated above in reference to the isolated preparation of the Si-activable, oligomeric azomethinesilane component A).

As a further component it is possible as well for the flowable additive of the invention to comprise Si-activable alkylsilanes or arylsilanes F) of the general formula (VI) (for example n-propyltrimethoxysilane):

$$R^{51}R^{52}R^{53}Si—R^{54} \quad (VI)$$

where
$R^{51}$ and $R^{52}$ each independently of one another=Cl, $OR^{55}$, $C_1$-$C_{18}$ n-alkyl (especially methyl, ethyl), $C_5$-$C_8$ cycloalkyl (especially cyclohexyl) or $C_1$-$C_{18}$ branched alkyl (especially isopropyl);
$R^{53}$=Cl or $OR^{55}$;
$R^{55}$=$C_1$-$C_6$ n-alkyl (especially methyl, ethyl), $C_1$-$C_6$ branched alkyl (especially isopropyl) or phenyl;
$R^{54}$=$C_1$-$C_{30}$ n-alkyl (preferably $C_1$-$C_{10}$ n-alkyl—especially methyl, ethyl, n-propyl), $C_1$-$C_{30}$ branched alkyl (preferably $C_1$-$C_{10}$ branched alkyl —especially isopropyl), $C_5$-$C_8$ cycloalkyl (especially cyclohexyl), $C_5$-$C_{18}$ aryl (especially phenyl) or $C_1$-$C_{30}$ alkylaryl (preferably $C_1$-$C_{10}$ alkylaryl—especially tolyl).

These Si-activable alkylsilanes or arylsilanes F) function in practice as water scavengers, by oligomerizing, in the presence of water, in accordance with the reaction principle described above ("step 2—oligomerization"). Normally the Si-activable alkylsilanes or arylsilanes F) are therefore present (like the Si-activable, oligomeric azomethinesilane component A)) in the additive of the invention in the form of oligomers—either homooligomers or, preferably, cooligomers, which contain structural units not only of the Si-activable, oligomeric azomethinesilane component A) but also of the Si-activable alkylsilanes or arylsilanes F). The Si-activable alkylsilanes or arylsilanes F) are inexpensive and therefore enhance in particular the economics of the additive.

The above-described flowable additive of the invention is suitable as an adhesion promoter and crosslinker in adhesives and sealants, for modifying and crosslinking organic resins, as a binder in paints and varnishes, for coating glass fibres and carbon fibres, as an adhesion promoter in filled thermoplastic compounds, for treating mineral, organic and metallic surfaces, for hydrophobizing surfaces, for surface-modifying substances in powder form, and for silanizing fillers and pigments.

The invention is illustrated below with reference to examples.

COMPARATIVE EXAMPLE 1

Azomethine Component B) Absent

In a 1 l stirred glass reactor with vacuum, metering and distillation facility, 221 g of 3-aminopropyltriethoxysilane (Dynasylan® AMEO—Degussa AG) are added dropwise over the course of 20 minutes to 200 g of 4-methyl-2-pentanone (methyl isobutyl ketone) to which 24 g of anhydrous magnesium sulphate have been added, and the mixture is subsequently heated to boiling at 120° C. under reflux and inert gas (nitrogen) for 180 minutes. After it has cooled, the mixture is filtered and the low boilers are stripped off.

COMPARATIVE EXAMPLE 2

Azomethine Component B) Absent

In a 1 l stirred glass reactor with vacuum, metering and distillation facility, 179 g of 3-aminopropyltrimethoxysilane (Silquest® A-1110—GE) and 15.2 g of n-propyltrimethoxysilane (Dynasylan® PTMO—Degussa AG) are added dropwise over the course of 20 minutes to 200 g of 4-methyl-2-pentanone (methyl isobutyl ketone), and the mixture is subsequently heated to boiling at 120° C. under reflux and inert gas (nitrogen) for 180 minutes. After it has cooled, the mixture is filtered and the low boilers are stripped off.

EXAMPLE 1

As Per Invention

In a 1 l stirred glass reactor with vacuum, metering and distillation facility, 221 g of 3-aminopropyltriethoxysilane (Dynasylan® AMEO—Degussa AG) and 3 g of ethylenediamine (Aldrich) are added dropwise over the course of 20 minutes to 205 g of 4-methyl-2-pentanone (methyl isobutyl ketone) to which 26 g of anhydrous magnesium sulphate have been added, and the mixture is subsequently heated to boiling at 120° C. under reflux and inert gas (nitrogen) for 180 minutes. After it has cooled, the mixture is filtered and the low boilers are stripped off.

APPLICATION EXAMPLE 1

10 g of D.E.R. 331 (a liquid bisphenol A epoxy resin from Dow Chemical), 90 g of ST-67 (Hanse-Chemie), liquid silylated polyurethane, and 5 g of Heloxy® Modifier 8 (Hexion), liquid aliphatic monoglycidyl ether, are mixed in a Hausschild Speedmixer® at room temperature for approximately 30 seconds, and in each case 10 g of the additives from Comparative Examples 1 and 2 and also from Inventive Example 1 are added to the mixture in the absence of moisture. Finally, mixing takes place for approximately 30 seconds.

Films 200 μm thick of the mixture prepared are applied to a glass plate by knife coating and are crosslinked at 23° C./50% relative humidity.

All three films crosslink—the film of Inventive Example 1, though, more rapidly than the films of each of Comparative Examples 1 and 2. The surfaces are in each case virtually tack-free.

APPLICATION EXAMPLE 2

5% by weight of D.E.R. 331 (Dow Chemical), 1% by weight of Polypox R 24 (UPPC AG) and 20% by weight of ST-67 (Hanse-Chemie) are mixed with 10% by weight of PPG 3000 (polypropylene glycol from Dow Chemical) and 0.7% by weight of methyl isobutyl ketone under vacuum in a planetary mixer for 30 minutes. Then 20% by weight of Socal U1S2 (precipitated chalk from Solvay Chemicals GmbH), 31.95% by weight of Omyacarb 2T-AV (ground chalk from Omya International AG) and 0.8% of Dynasylan VTMO (vinyltrimethoxysilane from Degussa AG) are dispersed under vacuum for 120 minutes. Finally 9.25% by weight of the additives from Comparative Examples 1 and 2 and also from Inventive Example 1, in the absence of moisture, 0.8% by weight of Dynasylan® GLYMO (3-glycidylpropyltrimethoxysilane from Degussa AG) and 0.5% by weight of BNT-CAT 440 (dibutyltin diketonate from BNT Chemicals GmbH) are added and the mixture is dispersed under vacuum for 30 minutes.

Adhesive layers approximately 4 mm thick of the mixture prepared are poured into a Teflon mould and cured under standard conditions: 23° C./50 % relative humidity.

A film 0.2 mm thick is applied in each case by knife coating.

All three films crosslink—the film of Inventive Example 1, though, more rapidly than the films of each of Comparative Examples 1 and 2. The surfaces are in each case virtually tack-free.

The invention claimed is:

1. Flowable additive comprising
an Si-activable, oligomeric azomethinesilane component A) and
an azomethine component B)
in a molar ratio of 100:0.1 to 1:1, with a fraction totalling >5% by weight,
the Si-activable, oligomeric azomethinesilane component A) being prepared by reacting
an aminosilane c) of the general formula $$R^1R^2R^3Si\text{—}(CH_2)_n\text{—}(CR^4R^5)\text{—}(CH_2)_n\text{—}NH\text{—}R^6 \quad (I)$$

where
n=1;
R$^4$ and R$^5$ each=H;
R$^1$ and R$^2$ each independently of one another =$C_1$-$C_{18}$ n-alkyl;

$R^3 = OR^7$;
$R^7 = C_1\text{-}C_6$ n-alky;
$R^6 = H$,
with formation of water and an Si-activable monomeric azomethinesilane component as intermediates, with a carbonyl compound d) of the general formula $$R^{11}-CO-R^{12} \qquad (II)$$

where
$R^{11} = C_1\text{-}C_{30}$ n-alkyl;
$R^{12} = C_1\text{-}C_{30}$ n-alkyl;
with the proviso that per mole of aminosilane c) employed there are 0.6 to 1.2 mol of the water intermediate formed available for the oligomerization—which consumes water as a reaction component—of the Si-activable monomeric azomethinesilane component produced as intermediate, and
the azomethine component B) is described by the general formula $$X-N=CR^{21}R^{22} \qquad (III)$$

where
$R^{21} = H$;
$R^{22} = C_1\text{-}C_{30}$ n-alkyl;
$X = C_1\text{-}C_{18}$ n-alkyl, having 1 to 3 alike or different $-N=CR^{21}R^{22}$ substituents.

2. Flowable additive according to claim 1, comprising an Si-inert, monomeric azomethinesilane component E) in a molar ratio to the Si-activable, oligomeric azomethinesilane component A) of 1:99 to 1:3, the Si-inert, monomeric azomethinesilane compound E) being described by the general formula $$R^{31}R^{32}R^{33}\text{Si}-(CH_2)_m-(CR^{34}R^{35})-(CH_2)_m-(Y-)_l\, N=CR^{41}R^{42} \qquad (IV)$$

where
m = 0 or 1;
$R^{34}$ and $R^{35}$ each independently of one another = H or $C_1\text{-}C_4$ n-alkyl;
$R^{31}$, $R^{32}$ and $R^{33}$ each independently of one another = $C_1\text{-}C_{18}$ n-alkyl, $C_5\text{-}C_8$ cycloalkyl or $C_3\text{-}C_{18}$ branched alkyl;
l = 0 to 2;
$Y = NH-CH_2-CH_2$;
$R^{41} = C_1\text{-}C_{30}$ n-alkyl, $C_3\text{-}C_{30}$ branched alkyl, $C_5\text{-}C_8$ cycloalkyl, $C_6\text{-}C_{18}$ aryl, $C_6\text{-}C_{30}$ alkylaryl or H;
$R^{42} = C_1\text{-}C_{30}$ n-alkyl, $C_3\text{-}C_{30}$ branched alkyl, $C_5\text{-}C_8$ cycloalkyl, $C_6\text{-}C_{18}$ aryl or $C_6\text{-}C_{30}$ alkylaryl;
or cyclic $C_5\text{-}C_8$ alkyl group formed jointly by $R^{41}$ and $R^{42}$ together with the C atom connecting $R^{41}$ and $R^{42}$.

3. Flowable additive according to claim 1, wherein the aminosilane c) is reacted with the carbonyl compound d) in a molar ratio of 1:0.9 to 0.9:1.

4. Flowable additive according to claim 1, wherein the Si-activable, oligomeric azomethinesilane component A) and the azoinethine component B) are present in a molar ratio of 20:1 to 4:1.

5. Flowable additive according to claim 1, wherein the Si-activable, oligomeric azomethinesilane component A) and the azomethine component B) are present with a fraction totalling >70% by weight of the flowable additive.

6. Flowable additive according to claim 1, wherein per aminosilane c) employed there is 0.7 to 0.9 mol of the water intermediate formed available for the oligomerization—which consumes water as a reaction component—of the Si-activable monomeric azomethinesilane component produced as intermediate.

7. Flowable additive according to claim 1, wherein the aminosilane c) is reacted with the carbonyl compound d) in an equimolar ratio.

8. Process for preparing a flowable additive according to claim 1, wherein the Si-activable, oligomeric azomethinesilane component A) and the azomethine component B) are prepared together in a reactor, by initially introducing the aminosilane c) and an amine component of the general formula $$Z-NH_2 \qquad (V)$$

with $Z = C_1\text{-}C_{18}$ n-alkyl, $C_5\text{-}C_8$ cycloalkyl or $C_3\text{-}C_{18}$ branched alkyl group, $C_1\text{-}C_{18}$ n-alkyl group containing O and/or N heteroatoms, $C_5\text{-}C_8$ cycloalkyl group containing O and/or N heteroatoms, or $C_3\text{-}C_{18}$ branched alkyl group containing O and/or N heteroatoms, substituted by in each case 0 to 3 primary amino groups and reacting this initial charge with the carbonyl compound d).

9. Process according to claim 8, wherein the reaction is carried out with heating at 10 to 200° C.

10. Process according to claim 8, wherein a portion of the water produced as an intermediate in the reaction, said portion not being intended to be made available for the oligomerization—which consumes water as a reaction component—of the Si-activable monomeric azomethinesilane component which forms as an intermediate, is removed in such a way that this portion does not take part as a reaction component in the oligomerization.

11. Process according to claim 8, wherein the reaction is carried out with heating at 80-150° C.

12. Process according to claim 11, wherein a portion of the water produced as an intermediate in the reaction, said portion not being intended to be made available for the oligomerization—which consumes water as a reaction component—of the Si-activable monomeric azomethinesilane component which forms as an intermediate, is removed in such a way that this portion does not take part as a reaction component in the oligomerization.

* * * * *